(12) United States Patent
Asakura et al.

(10) Patent No.: US 7,010,222 B2
(45) Date of Patent: Mar. 7, 2006

(54) LENS-FITTED PHOTO FILM UNIT AND CASSETTE FOR PHOTO FILM

(75) Inventors: Katsuyoshi Asakura, Kanagawa (JP); Yasuhiro Yamashina, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 29 days.

(21) Appl. No.: 10/755,276

(22) Filed: Jan. 13, 2004

(65) Prior Publication Data

US 2004/0141734 A1 Jul. 22, 2004

(30) Foreign Application Priority Data

Jan. 16, 2003 (JP) ............................. 2003-008662
Dec. 25, 2003 (JP) ............................. 2003-429303

(51) Int. Cl.
*G03B 17/02* (2006.01)
*G03B 17/26* (2006.01)

(52) U.S. Cl. ........................... 396/6; 396/512; 396/538
(58) Field of Classification Search .................. 396/6, 396/512–515, 538
See application file for complete search history.

(56) References Cited

U.S. PATENT DOCUMENTS

| 5,245,376 | A | | 9/1993 | Takahashi |
| 5,408,288 | A | | 4/1995 | Ogura et al. |
| 5,435,500 | A | * | 7/1995 | Shibata .................... 242/348.4 |
| 5,721,961 | A | * | 2/1998 | Kameyama .................... 396/6 |
| 6,249,646 | B1 | * | 6/2001 | Chen ............................. 396/6 |

* cited by examiner

*Primary Examiner*—Christopher E Mahoney
(74) *Attorney, Agent, or Firm*—Young & Thompson

(57) ABSTRACT

A lens-fitted photo film unit contains a photo film cassette, which includes a spool for winding the photo film in a roll form thereabout. A body tube contains the photo film and the spool in a rotatable manner, has a first end with a first end opening, and a second end with a second end opening. A first end cap closes the first end opening, and has an outer diameter d1. A second end cap closes the second end opening, has an outer diameter d2, and satisfies a condition of:

d2<d1.

To contain the cassette, a cassette holder chamber in the lens-fitted photo film unit has a size corresponding to that of the cassette.

25 Claims, 10 Drawing Sheets

LENS-FITTED PHOTO FILM UNIT AND CASSETTE FOR PHOTO FILM

BACKGROUND OF THE INVENTION

1. Field of the Invention

The present invention relates to a lens-fitted photo film unit and a cassette for photo film. More particularly, the present invention relates to a lens-fitted photo film unit adapted to recycling of parts without lowering quality in the photographic performance, and a cassette for photo film.

2. Description Related to the Prior Art

A lens-fitted photo film unit is widely used, and is constituted by a housing and mechanisms for taking an exposure. The housing is loaded with a photo film cassette, and a roll of photo film which has been drawn from the photo film cassette. The mechanisms include a shutter and a film winder, which can cause a manufacturing cost to be low. The lens-fitted photo film unit is marketed widely because of its great ease in the manual handling as well as the low cost. After the lens-fitted photo film unit is used, used parts in the same are withdrawn by a manufacturer. Some of the parts are reused as themselves. Other parts are recycled as raw material.

To prevent unacceptable reuse of the lens-fitted photo film unit after being used, there have been various ideas for constructing the lens-fitted photo film unit. For example, a small-diameter cassette is prepared with a smaller diameter than the photo film cassette of 135 type according to the standards. A cassette holder chamber is formed in the lens-fitted photo film unit, has a relatively small size, and is loaded with the small-diameter cassette. According to this, unacceptable reuse of parts of the lens-fitted photo film unit can be prevented, because the photo film cassette of 135 type cannot be inserted in the cassette holder chamber of the lens-fitted photo film unit.

However, there is a problem in that a photo film processor cannot be loaded directly with the small-diameter cassette because of a difference in the size. An specialized attachable pad must be attached to the small-diameter cassette before the small-diameter cassette can be loaded in the photo film processor with a size of 135 type of the photo film cassette. The problem lies in the extreme complexity in the precessing operation.

SUMMARY OF THE INVENTION

In view of the foregoing problems, an object of the present invention is to provide a lens-fitted photo film unit adapted to recycling of parts without lowering quality in the photographic performance, and a cassette for photo film.

Another object of the present invention is to provide a lens-fitted photo film unit, and a cassette for photo film, with which operation of processing photo film can be effected at a normally high speed without lowering the efficiency.

In order to achieve the above and other objects and advantages of this invention, a lens-fitted photo film unit has a photo film holder chamber for containing a roll of an unexposed photo film, and a cassette holder chamber for containing a photo film cassette adapted to winding and containing an exposed portion of the photo film therein. In the lens-fitted photo film unit, the photo film cassette includes a first end with a first end panel, and a second end with a second end panel, the first end panel having an outer diameter $d_1$ that is in a range of a regular body outer diameter of a photo film cassette of 135 type, the second end panel having an outer diameter $d_2$. The cassette holder chamber includes a first chamber end region for containing the first end panel, and has an inner diameter $D_1$. A second chamber end region contains the second end panel, and has an inner diameter $D_2$. The photo film cassette and the cassette holder chamber satisfy a condition of:

$$d_2 \leq D_2 < d_1 \leq D_1.$$

Furthermore, a lid portion covers the first chamber end region, to close the cassette holder chamber in a light-tight manner. The lid portion is opened after exposure of the photo film, and the photo film cassette is slid from the cassette holder chamber by advance of the first end panel for removal therefrom.

The first chamber end region, the first end panel, and the lid portion are disposed lower, and the second chamber end region and the second end panel are disposed higher.

The photo film cassette includes a body tube having first and second end openings closed by respectively the first and second end panels. At least one of the first and second end panels has a cap shape, and has a first or second cap flange, disposed thereabout, for being fitted on an outer face of an edge of the first or second end opening.

Also, 24.90 mm $\leq D_2 \leq$ 25.10 mm.

In one preferred embodiment, 24.60 mm $\leq D_2 \leq$ 24.90 mm.

The cassette holder chamber includes a chamber middle region, disposed between the first and second chamber end regions, for containing the body tube, the chamber middle region having a middle inner diameter equal to or smaller than the inner diameter $D_1$.

The middle inner diameter is equal to or greater than the inner diameter $D_2$.

The photo film cassette further includes a spool for winding the photo film in a roll form thereabout. First and second axial holes are formed in respectively the first and second end panels, for receiving insertion of spool ends of the spool in a rotatable manner.

The first end panel has the cap shape, and the body tube and the second end panel are formed together by operation of drawing.

According to another preferred embodiment, the first end panel has the cap shape, and the second end panel is formed with the body tube by insert molding.

According to still another preferred embodiment, the body tube includes a middle portion, and a small-diameter ring-shaped portion, having the second end opening therein, disposed to extend from the middle portion, and having a diameter smaller than a diameter of the middle portion. The second end panel has the cap shape, and has the second cap flange fitted on an outer face of the small-diameter ring-shaped portion.

The spool includes a spool core, having spool ends, for winding the photo film between. First and second spool flanges are positioned at respectively the spool ends, for regulating edges of the photo film being wound.

According to one preferred embodiment, the first and second spool flanges have a thickness of 0.3 mm or less. A cassette shell is constituted by a combination of the body tube with the first and second end panels, and has a height smaller than a body height of the photo film cassette of the 135 type.

In one aspect of the invention, the photo film cassette and the cassette holder chamber satisfy conditions of:

$$d_2 \leq D_2,$$

$$d_1 \leq D_1,$$

D2<D1, and 24.90 mm ≦ D2 ≦ 25.10 mm.

In another aspect of the invention, the photo film cassette and the cassette holder chamber satisfy conditions of:

d2 ≦ D2, d1 ≦ D1,

D2<D1, and 24.60 mm ≦ D2 ≦ 24.90 mm.

In one aspect of the invention, a lens-fitted photo film unit includes a photo film holder chamber for containing a roll of an unexposed photo film. A cassette holder chamber contains a photo film cassette adapted to winding and containing an exposed portion of the photo film therein. At least one portion of the cassette holder chamber has one small inner diameter in a range of 24.90–25.10 mm.

The cassette holder chamber includes upper and lower chamber end regions, and a chamber middle region disposed between the upper and lower chamber end regions. A lid portion covers and closes the lower chamber end region in a light-tight manner, wherein the lid portion is opened after exposure of the photo film, and the photo film cassette is slid from the cassette holder chamber by advance of the lower end panel for removal therefrom. The at least one portion is constituted by at least one of the upper chamber end region and the chamber middle region, and the one small inner diameter is smaller than a regular body outer diameter of a photo film cassette of 135 type.

The lower chamber end region has a size according to the regular body outer diameter of the 135 type.

The photo film cassette includes upper and lower end panels disposed in respectively the upper and lower chamber end regions. A body tube between the upper and lower end panels is disposed in the chamber middle region, and has a smaller outer diameter than the regular body outer diameter of the 135 type. The at least one portion is constituted by an inside of the chamber middle region.

At least a selected one of the upper and lower end panels and the body tube has a greatest diameter thereof, the greatest diameter is smaller than the one small inner diameter, to set the selected one passable through the chamber middle region.

The upper and lower chamber end regions have a greater inner diameter than the one small inner diameter.

In another aspect of the invention, a photo film cassette includes a spool for winding the photo film in a roll form thereabout. A cassette shell contains the photo film and the spool in a rotatable manner, has a first end with a first end panel, and a second end with a second end panel. The first end panel has an outer diameter d1 that is in a range of a regular body outer diameter of a photo film cassette of 135 type. The second end panel has an outer diameter d2 in a range of 24.60–24.90 mm.

The cassette shell includes a body tube having first and second end openings closed by respectively the first and second end panels, and at least one of the first and second end panels is secured to the body tube.

The body tube has an outer diameter equal to or smaller than the outer diameter d1.

In one preferred embodiment, the body tube has a middle outer diameter in a range of the regular body outer diameter of the photo film cassette of the 135 type.

According to the present invention, it is possible to recycle parts of products without lowering quality in the photographic performance, because the reloading of a photo film cassette is allowed only in a genuine form. Also, operation of processing photo film can be effected at a normally high speed without lowering the efficiency, because the size of the entirety of the photo film cassette is not extremely small but is kept large enough for being handled unfailingly.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
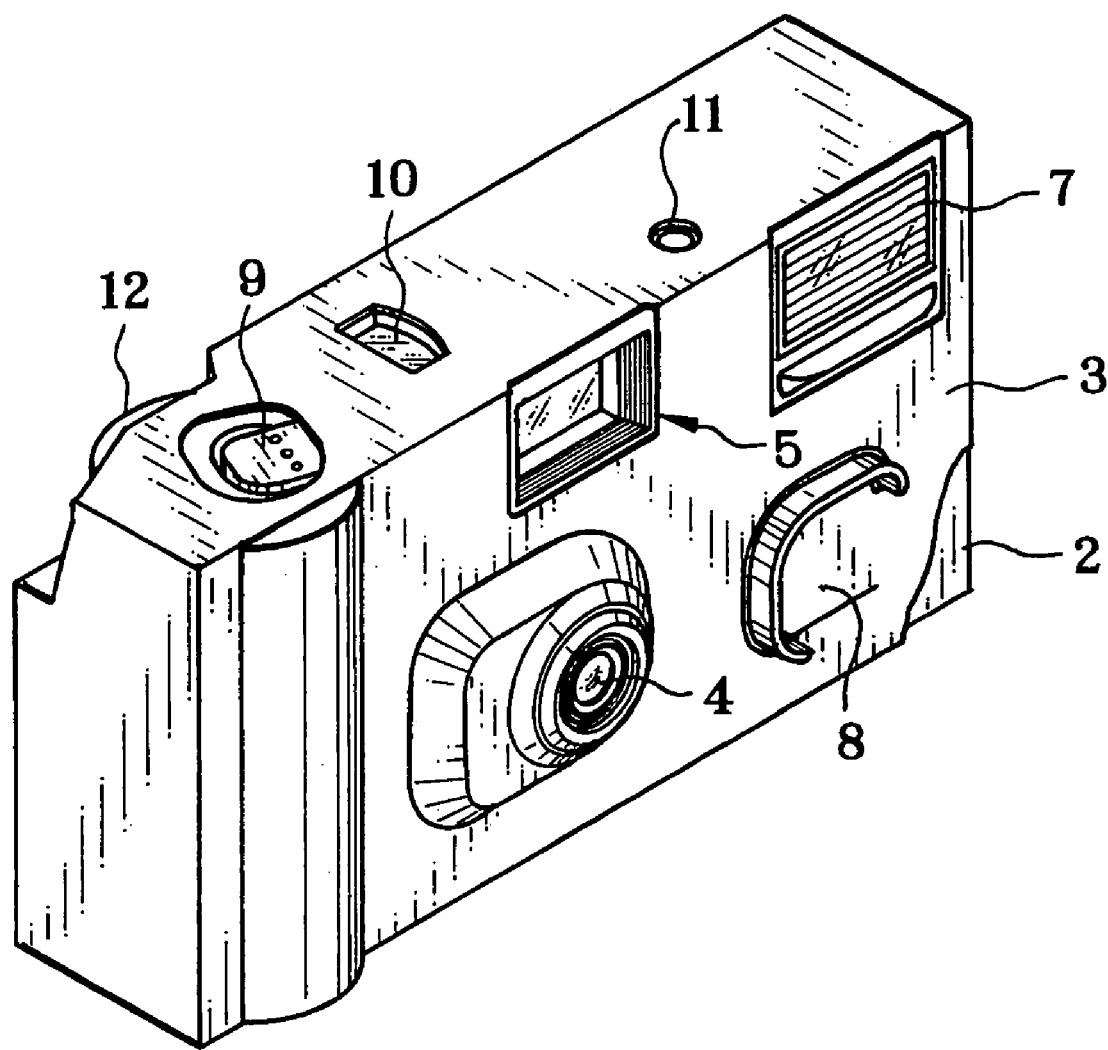
FIG. 1 is a perspective illustrating a lens-fitted photo film unit.

In FIG. 1, a lens-fitted photo film unit of the invention is illustrated. A housing 2 includes various relevant elements incorporated therein, including a shutter, a photo film winder, a flash light source and the like. A cardboard wrapper 3 covers the outside of the housing 2. A photo film cassette is loaded in the housing 2. Unexposed photo film from the photo film cassette is previously wound in a form of a roll, which is contained in the housing 2 together with a cassette shell of the photo film cassette.

A front of the housing 2 is provided with a taking lens 4, an objective window of a viewfinder 5, a flash light source 7, a flash charger 8 and the like. An upper side of the housing 2 is provided with a shutter release button 9, a frame counter 10 and a flash readiness indicator 11. The frame counter 10 has a window, and indicates a number of remaining unexposed frames. The flash readiness indicator 11 illuminates and indicates a ready state for emitting flash light. Also, a winder wheel 12 appears in the rear of the housing 2, and is rotatable for taking each one exposure. The cardboard wrapper 3 includes plural openings through which the taking lens 4, the viewfinder 5 and the frame counter 10 appear externally.

In a manner similar to a conventional type of lens-fitted photo film unit, the winder wheel 12 is rotated to advance and wind the photo film. The release button 9 is depressed to take an exposure. A charger button is operated for the purpose of charging the flash light source 7. The release button 9 is depressed after completion of the charging. In synchronism with the flash, the flash light source 7 is driven to emit flash light toward a photographic object. The flash charger 8 is a pushbutton and used for charging the flash. The flash readiness indicator 11 as a lamp illuminates to generate information or signal representing the completion of the charging.

Figure 2:
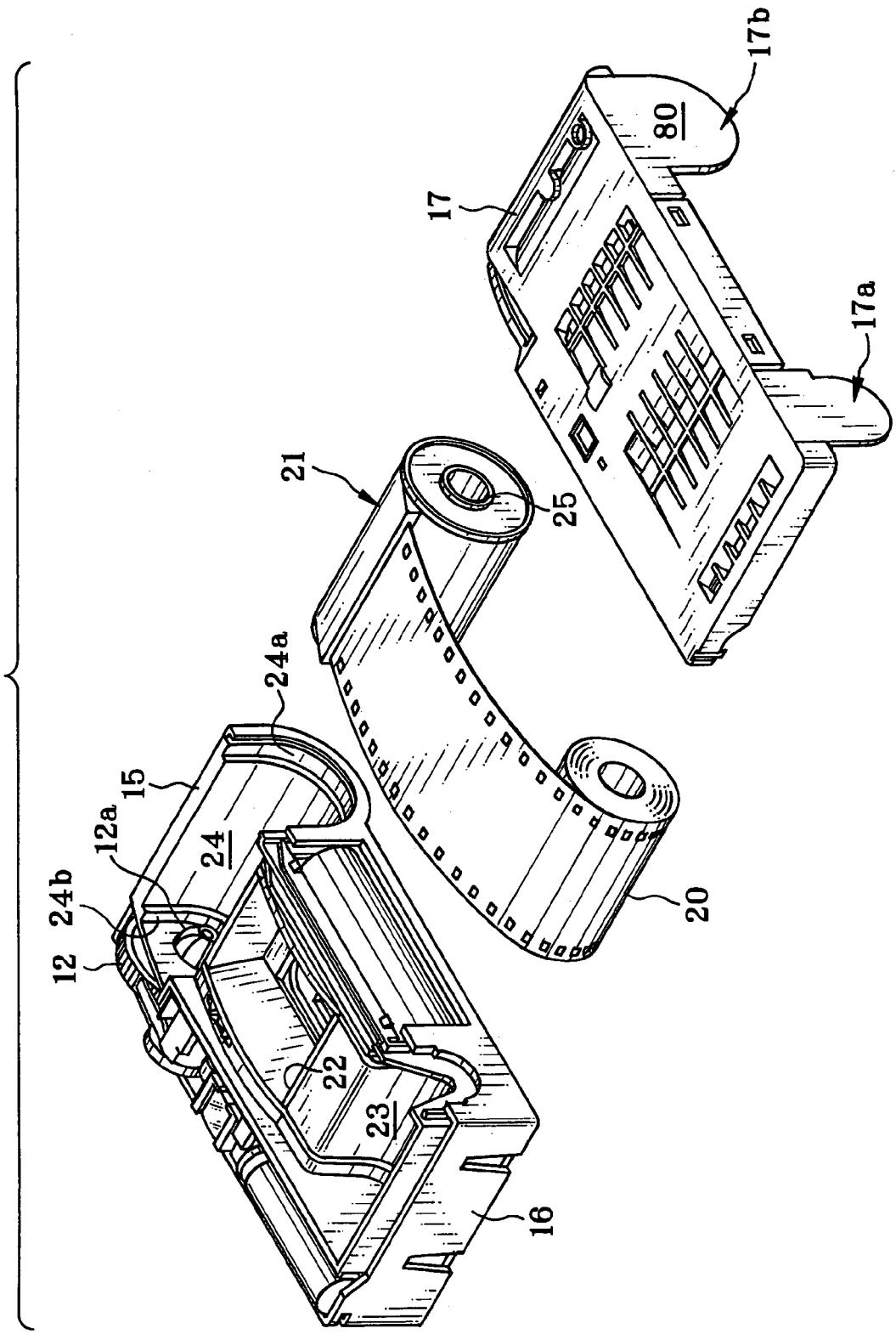
FIG. 2 is an exploded perspective illustrating the lens-fitted photo film unit of FIG. 1.

In FIG. 2, the housing 2 is constituted by a main body 15, a front cover 16 and a rear cover 17, and is loaded with photo film 20 and a photo film cassette 21 of 135 type.

There is an exposure aperture 22 disposed in the center of the main body 15, for regulating object light passed through the taking lens 4, to determine a size of a frame to be created on the photo film 20. A photo film holder chamber 23 and a cassette holder chamber 24 are disposed so that the exposure aperture 22 is located between those. The photo film holder chamber 23 is loaded with a roll of the photo film 20 which has been drawn out of the photo film cassette 21. The cassette holder chamber 24 is loaded with the photo film cassette 21.

The winder wheel 12 is disposed on the upper side of the cassette holder chamber 24 in a rotatable manner. A wheel core 12a protrudes from a lower surface of the winder wheel 12. A spool 25 of the photo film cassette 21 becomes engaged with the wheel core 12a. Thus, a rotating operation of the winder wheel 12 causes an exposed portion of the photo film 20 to enter the photo film cassette 21. An unexposed portion of the photo film 20 is set on the rear of the exposure aperture 22.

Elements are provided on a front of the main body 15, including a shutter mechanism, a frame counting mechanism, the taking lens 4, lens elements of the viewfinder 5, the flash light source and the like. The shutter mechanism is actuated in response to depression of the release button 9, and drives a shutter blade. The frame counting mechanism indicates an integer number of remaining available frames. The front cover 16 is secured to the main body 15 in a position to retain those elements.

The rear cover 17 covers the rear of the main body 15 containing the photo film 20 and the photo film cassette 21. There are lower lid portions 17a and 17b included in the rear cover 17. A lower opening of the photo film holder chamber 23 is closed by the lower lid portion 17a. A lower opening of the cassette holder chamber 24 is closed by the lower lid portion 17b. After all exposures are taken by use of the photo film cassette 21, the rear cover 17 is opened by external operation for removing the photo film cassette 21 containing the photo film 20 being exposed. To remove the photo film cassette 21, the lower lid portion 17b is kept open. The photo film cassette 21 is slid and moved toward a lower surface 80 of the housing 2 to pull the photo film 20 away from the cassette holder chamber 24.

Figure 3:
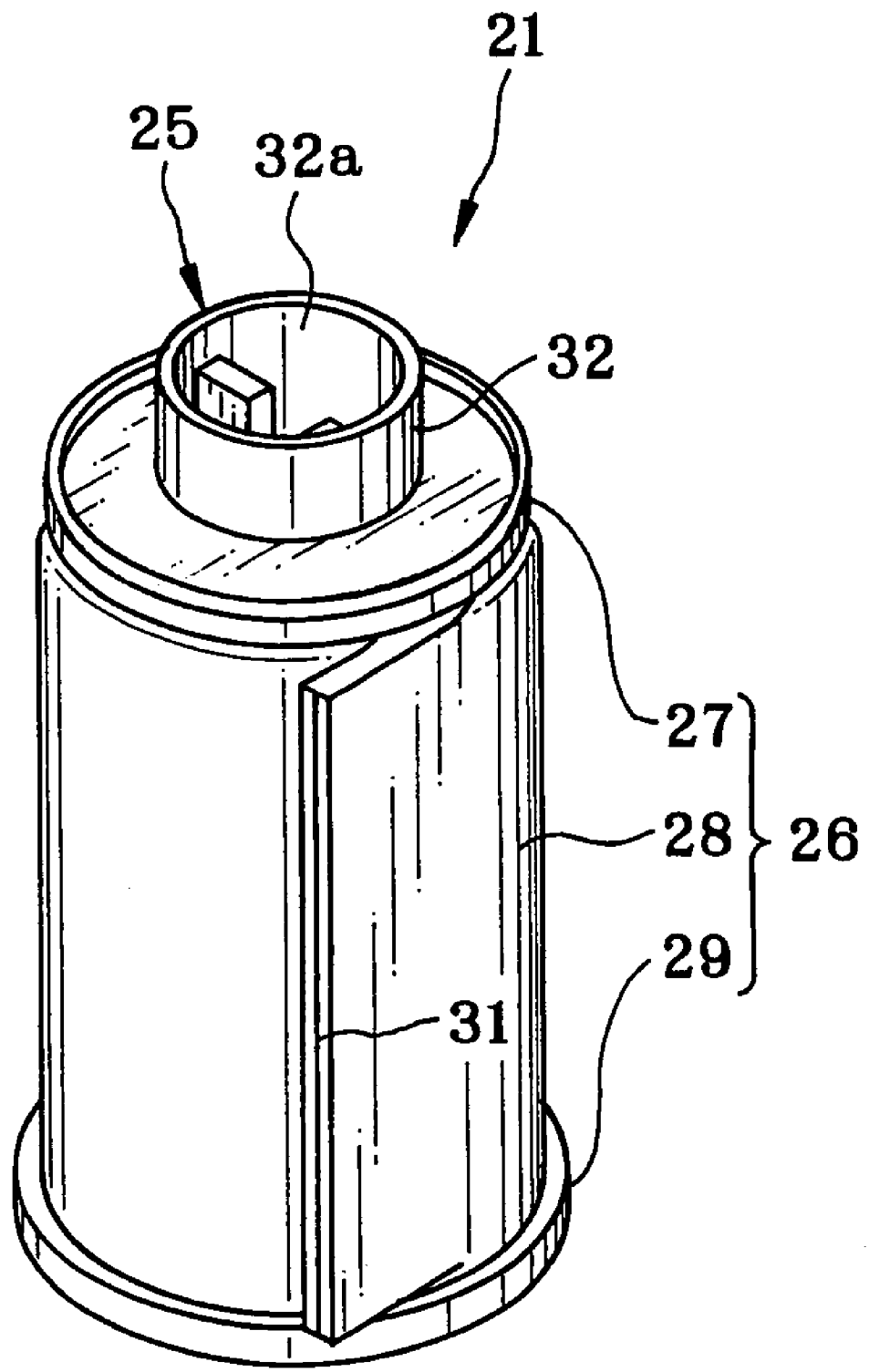
FIG. 3 is a perspective illustrating a photo film cassette of the lens-fitted photo film unit.
Figure 4:
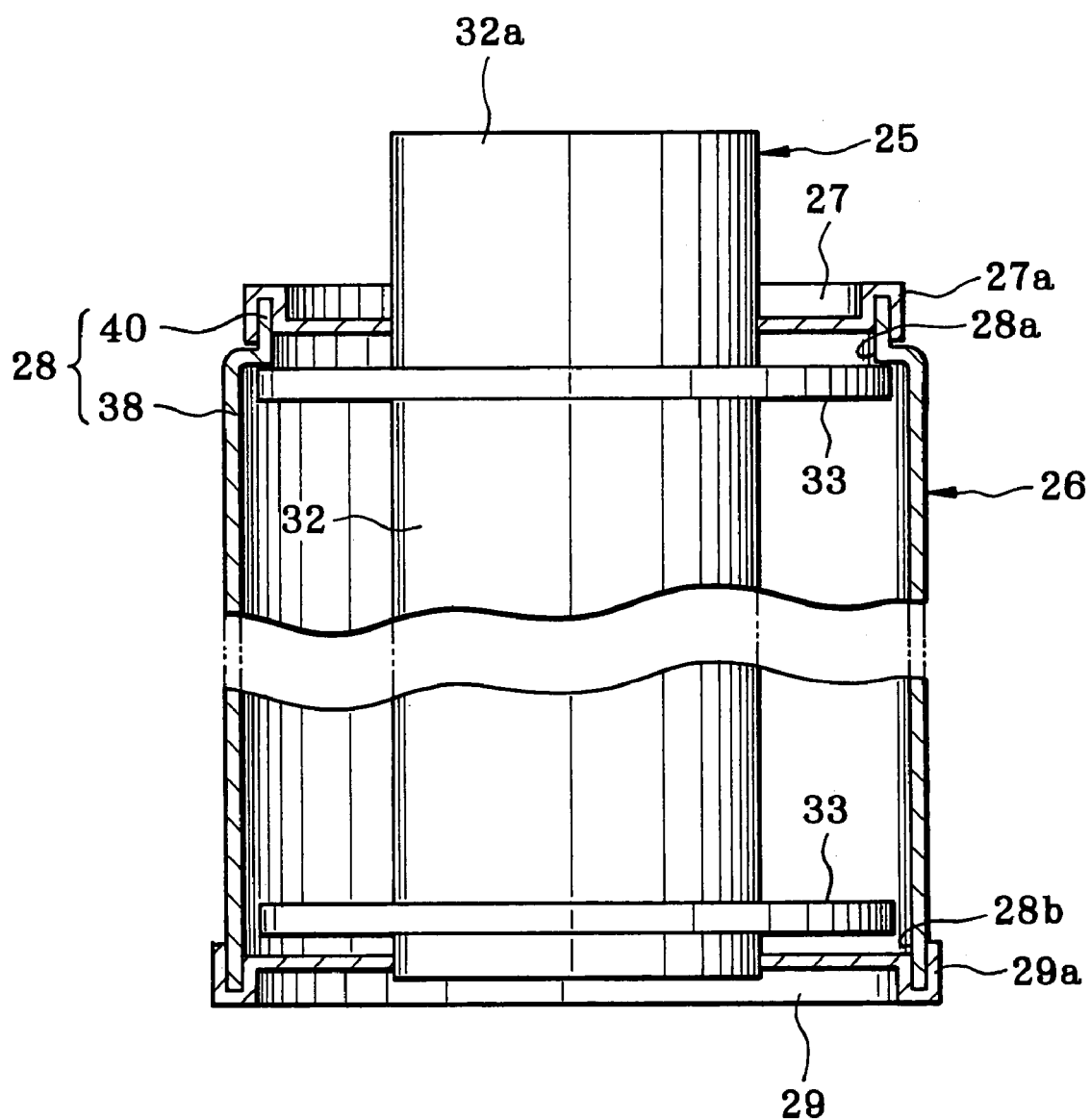
FIG. 4 is a vertical section illustrating the photo film cassette.

In FIGS. 3 and 4, outer appearance of the photo film cassette 21 is illustrated. The photo film cassette 21 is constituted by the spool 25 and a cassette shell 26. The spool 25 is provided with the photo film 20 wound thereabout. The cassette shell 26 is shaped cylindrically, and contains the photo film 20 wound on the spool 25. The cassette shell 26 includes a body tube 28, a lower end cap 29 as a first end panel, and an upper end cap 27 as a second end panel. The body tube 28 is formed by bending a thin plate of metal, of which two end portions are folded so that a passageway 31 for the photo film is defined. Plush or light-trapping fabric (not shown) is attached to the inside of the passageway 31.

An upper end opening 28a of the body tube 28 is closed by the upper end cap 27. A lower end opening 28b as a first end opening of the body tube 28 is closed by the lower end cap 29. The upper and lower end caps 27 and 29 are produced from metal, and have circular disks in a ring shape having a central hole. A first cap flange 29a is included in the lower end cap 29 and projects upwards. A second cap flange 27a is included in the upper end cap 27 and projects downwards. The first cap flange 29a is fitted outside the lower end opening 28b, and kept fixed by caulking, to secure the lower end cap 29 firmly to the body tube 28. Similarly, the second cap flange 27a is fitted outside the upper end opening 28a, and kept fixed by caulking to secure the upper end cap 27 firmly to the body tube 28.

The spool 25 is constituted by a spool core 32 and two spool flanges 33, which are arranged at an interval according to a strip width of the photo film 20. Ends of the spool core 32 are inserted in axial holes of the upper and lower end caps 27 and 29 to keep the spool 25 rotatable. An upper spool end 32a of the spool core 32 protrudes externally over the upper end cap 27 of the cassette shell 26, and becomes engaged with the wheel core 12a of the winder wheel 12. A trailing end of the photo film 20 is retained on a portion of the spool core 32 between the spool flanges 33. When the spool 25 is rotated by manual operation of the winder wheel 12, the photo film 20 becomes wound about the spool core 32, and contained into the cassette shell 26.

Figure 5:
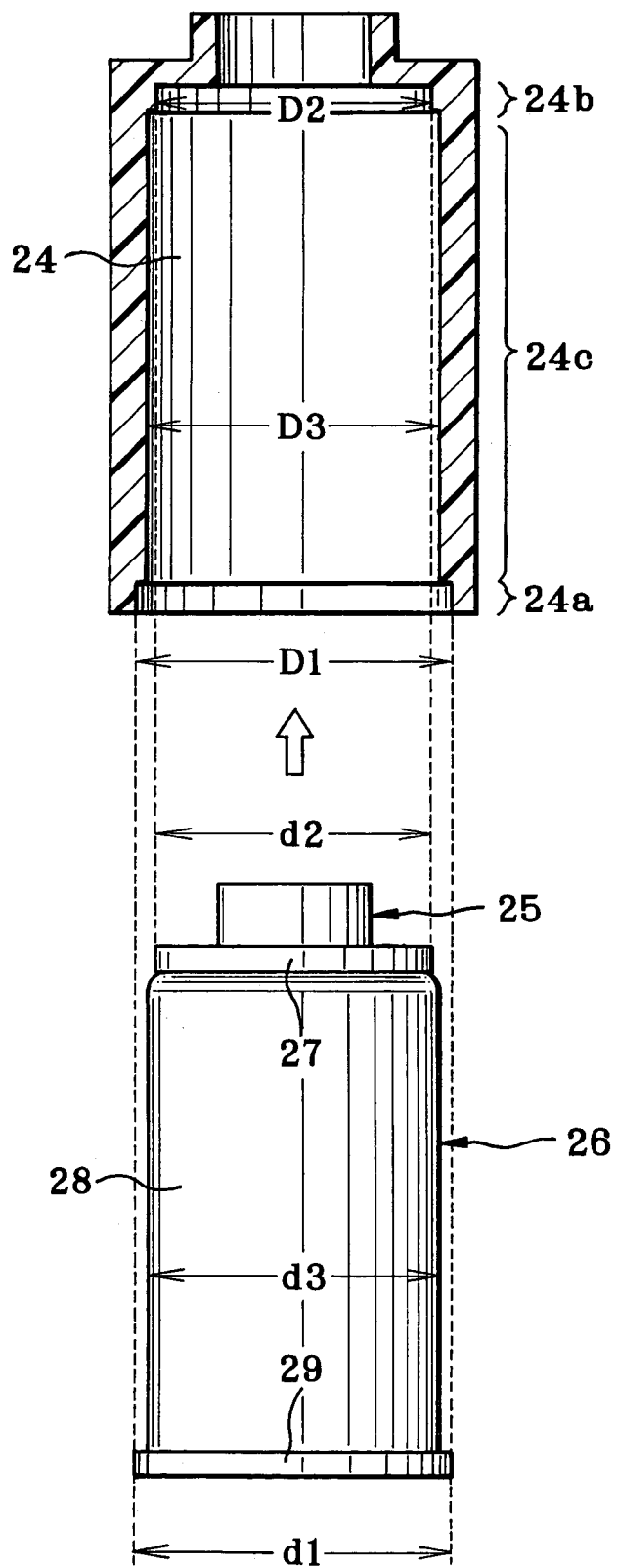
FIG. 5 is a vertical section illustrating a cassette holder chamber loadable with the photo film cassette.

In FIG. 5, an outer diameter of the photo film cassette 21 and an inner diameter of the cassette holder chamber 24 are indicated. There is a middle portion 38 of the body tube 28. Let d1 be an outer diameter of the cassette shell 26 at the lower end cap 29. Let d3 be an outer diameter of the middle portion 38 of the body tube 28. The outer diameters d1 and d3 are determined within a tolerable range of standardized sizes according to the photo film cassette of 135 type. For example, U.S. Pat. No. 5,408,288 (corresponding to JP-A 6-082974) discloses 135 type. The diameter d3 is greater than the diameter d1 by the thickness of portions of the lower end cap 29.

In the cassette shell 26, the outer diameter d2 across the upper end cap 27 is smaller than the outer diameter d1 across the lower end cap 29. In FIG. 4, a small-diameter ring-shaped portion 40 is formed to provide the upper end opening 28a with a smaller diameter. The upper end cap 27 has the outer diameter d2 suitable according to the size of the upper end opening 28a. Note that the outer diameter d2 can be greater or smaller than the outer diameter d3 of the middle portion 38 of the small-diameter ring-shaped portion 40, but must be smaller than the outer diameter d1. Preferably, the outer diameter d2 can be equal to or smaller than the outer diameter d3.

The cassette holder chamber 24 includes a lower chamber end region 24a as a first chamber end region, and an upper chamber end region 24b as a second chamber end region. The lower chamber end region 24a is positioned to contain the lower end cap 29 of the cassette shell 26. The upper chamber end region 24b is positioned to contain the upper end cap 27. An inner diameter D1 of the lower chamber end region 24a is predetermined smaller than an inner diameter D2 of the upper chamber end region 24b. Namely, the cassette holder chamber 24 satisfies the condition of $$d2 \leq D2 < d1 \leq D1.$$

The inner diameter D1 of the lower chamber end region 24a can be equal to or slightly greater than the outer diameter d1 at the lower end cap 29 in a sufficient manner for containing the lower end cap 29 of the cassette shell 26. The inner diameter D2 of the upper chamber end region 24b can be equal to or slightly greater than the outer diameter d2 at the upper end cap 27 in a sufficient manner for containing the upper end cap 27. However, the inner diameter D2 is determined smaller than the outer diameter d1.

Let D3 be an inner diameter of a chamber middle region 24c of the cassette holder chamber 24 for containing the middle portion 38 of the body tube 28 in the cassette shell 26. The inner diameter D3 can be equal to or more than the outer diameter d3 of the middle portion 38 of the body tube 28. In the present embodiment, the photo film cassette 21 is slid out of the cassette holder chamber 24 for the removal. To this end, it is necessary that the inner diameter D3 should be equal to or more than the outer diameter d2 at the upper end cap 27 in order to allow its passage. In the present embodiment, the inner diameter D2 of the upper chamber end region 24b is predetermined smaller than the inner diameter D3 because the outer diameter d2 of the upper end cap 27 is smaller than the outer diameter d3. However, the inner diameter D2 of the upper chamber end region 24b can be predetermined equal to or more than the inner diameter D3 in a range satisfying the condition of d2≦D2<d1≦D1.

The outer diameters and the inner diameters of the photo film cassette 21 and the cassette holder chamber 24 are determined in this manner, to keep the cassette holder chamber 24 loadable with the photo film cassette 21. In contrast, the conventional type of 135 type sold in the market cannot be inserted, because the outer diameter d2 of 135 type is greater than the inner diameter D2 of the upper chamber end region 24b of the cassette holder chamber 24. Consequently, it is possible to prevent reloading a lens-fitted photo film unit with an easily available photo film cassette.

The cassette shell 26 has the outer diameter d2 across the upper end cap 27 smaller than the outer diameter d1 across the lower end cap 29. This allows removing the photo film cassette 21 from the cassette holder chamber 24 by sliding from the cassette holder chamber 24 toward the lower surface 80 for the purpose of unload the photo film 20 from the housing 2.

Also, the photo film cassette 21 according to the preferred embodiment can be loaded in a photo film processor or other optical instruments, because the photo film cassette 21 has a size very near to that of the conventional cassette of 135 type.

Figure 6:
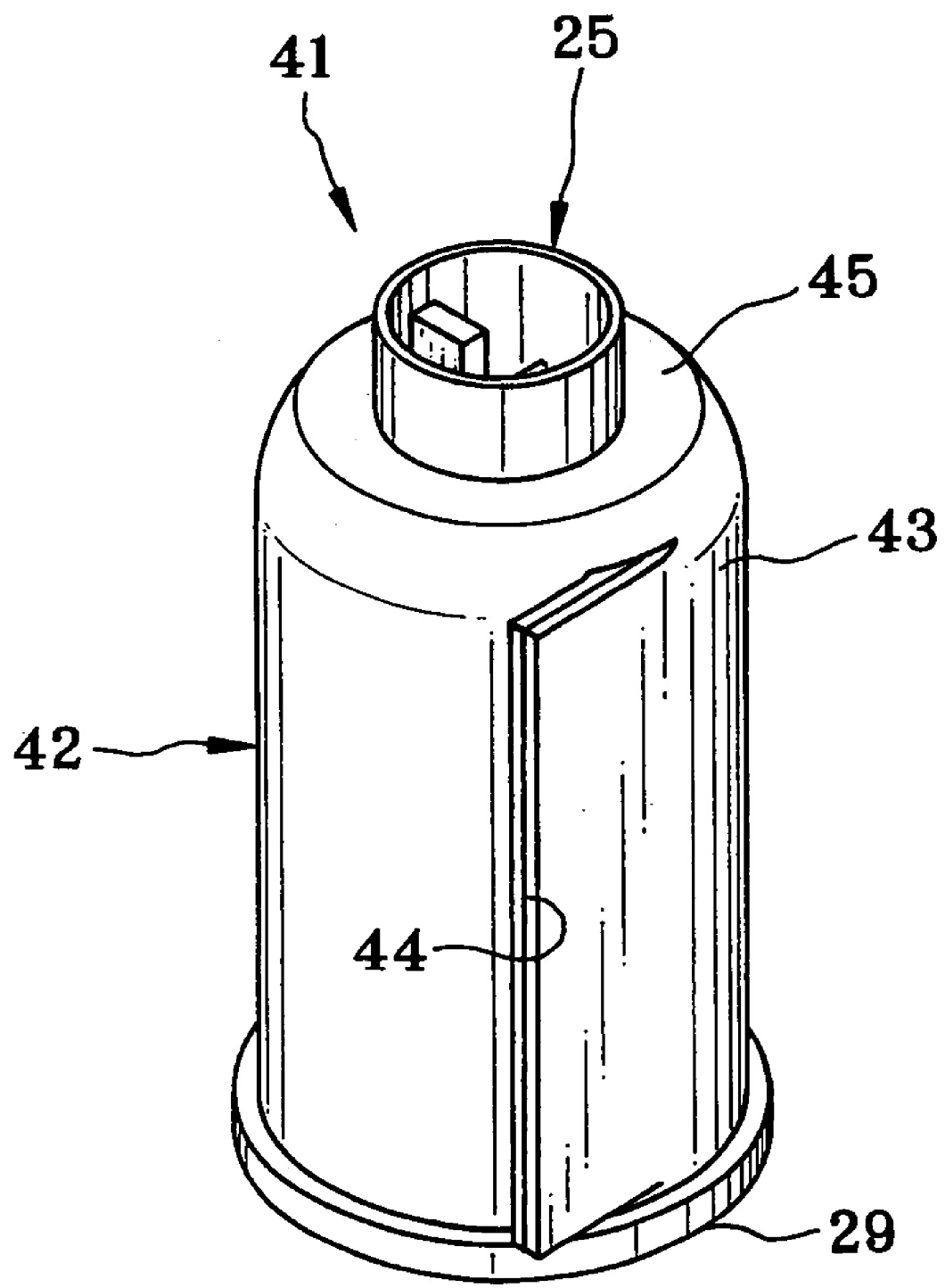
FIG. 6 is a perspective illustrating another preferred photo film cassette of which an upper end panel is formed by the drawing method.

In FIG. 6, a photo film cassette 41 produced by use of a drawing method is illustrated. A cassette shell 42 of the photo film cassette 41 contains the spool 25. The cassette shell 42 is constituted by two parts which are a body tube 43 and the lower end cap 29. Elements similar to those in the above embodiment are designated by identical reference numerals.

To obtain the body tube 43, a cylindrical member is at first formed in a cup shape by the drawing, and then is provided with a passageway 44 and an axial hole in an upper end panel 45 as a second end panel. The body tube 43 is then provided with light-trapping fabric in the passageway 44, loaded with the spool 25 and the photo film 20 thereon. A lower end opening of the body tube 43 is provided with the lower end cap 29 to obtain the photo film cassette 41. Note that the it is possible to form the passageway 44 from resin or any suitable material. Also, the body tube 43 can be formed from resin or suitable materials other than the metal.

Figure 7:
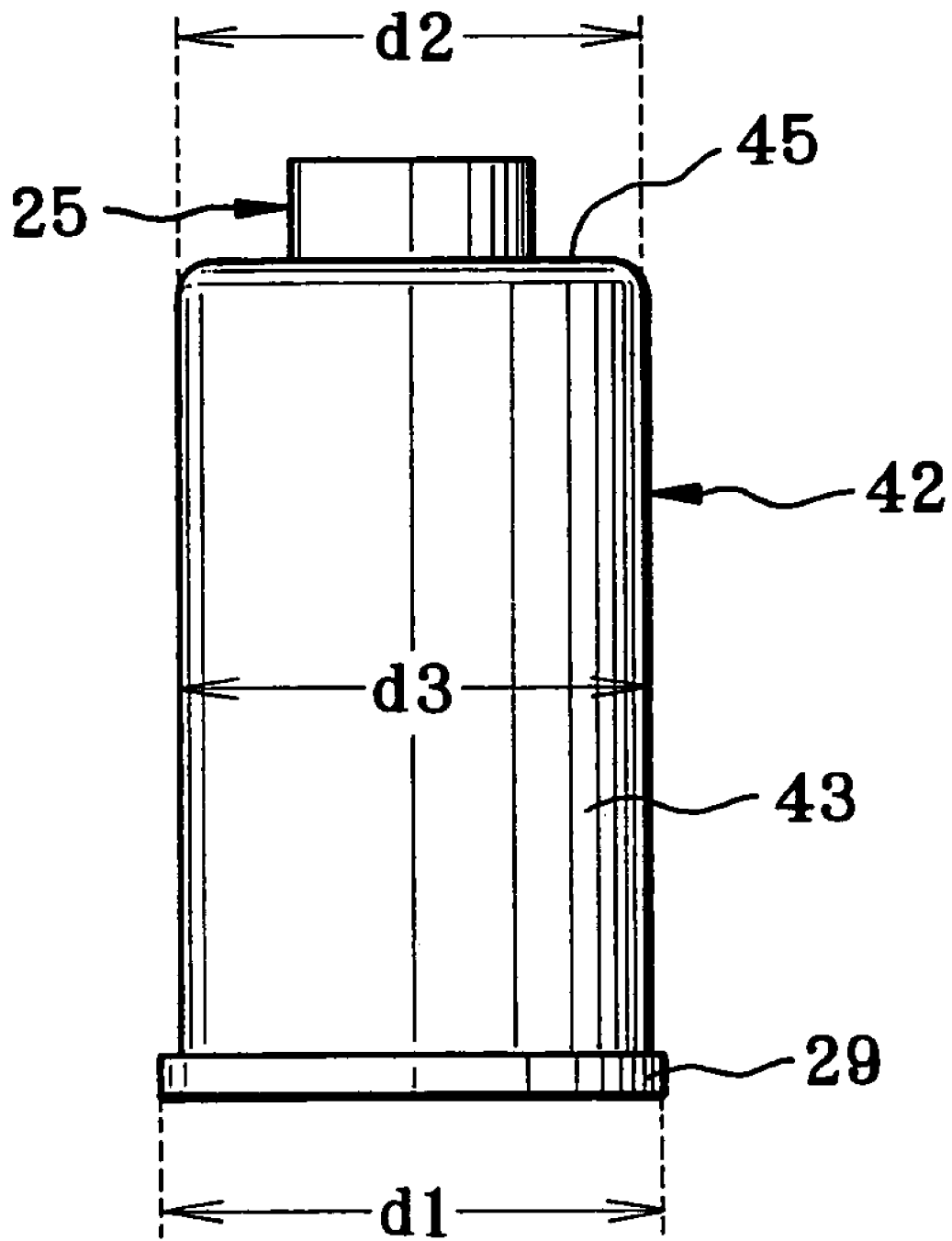
FIG. 7 is a front elevation illustrating the photo film cassette.

In the cassette shell 42 in FIG. 7, the outer diameter d1 at the lower end cap 29 and an outer diameter d3 across the body tube 43 are equal to those according to 135 type. The outer diameter d1 is greater than the outer diameter d3 by the thickness of edge portions of the lower end cap 29. An outer diameter d2 across the upper end panel 45 is predetermined smaller than the outer diameter d1. The cassette holder chamber 24 satisfies the condition of the inner diameter D1 of the lower chamber end region 24a and the inner diameter D2 of the upper chamber end region 24b as expressed by d2≦D2<d1≦D1.

In the present embodiment, the outer diameter d2 of the upper end panel 45 is equal to the outer diameter d3 of the middle portion of the body tube 43. However, the outer diameter d2 of the upper end panel 45 can be predetermined smaller or greater than the outer diameter d3 of the middle portion of the body tube 43.

Forming of the upper end panel 45 with the body tube 43 in the cassette shell 42 can be possible by the drawing of the body tube 28 of the cassette shell 42. This is effective in determining the upper outer diameter small in comparison with the fitting of the upper end panel. Also, the number of the parts can be reduced.

Figure 8:
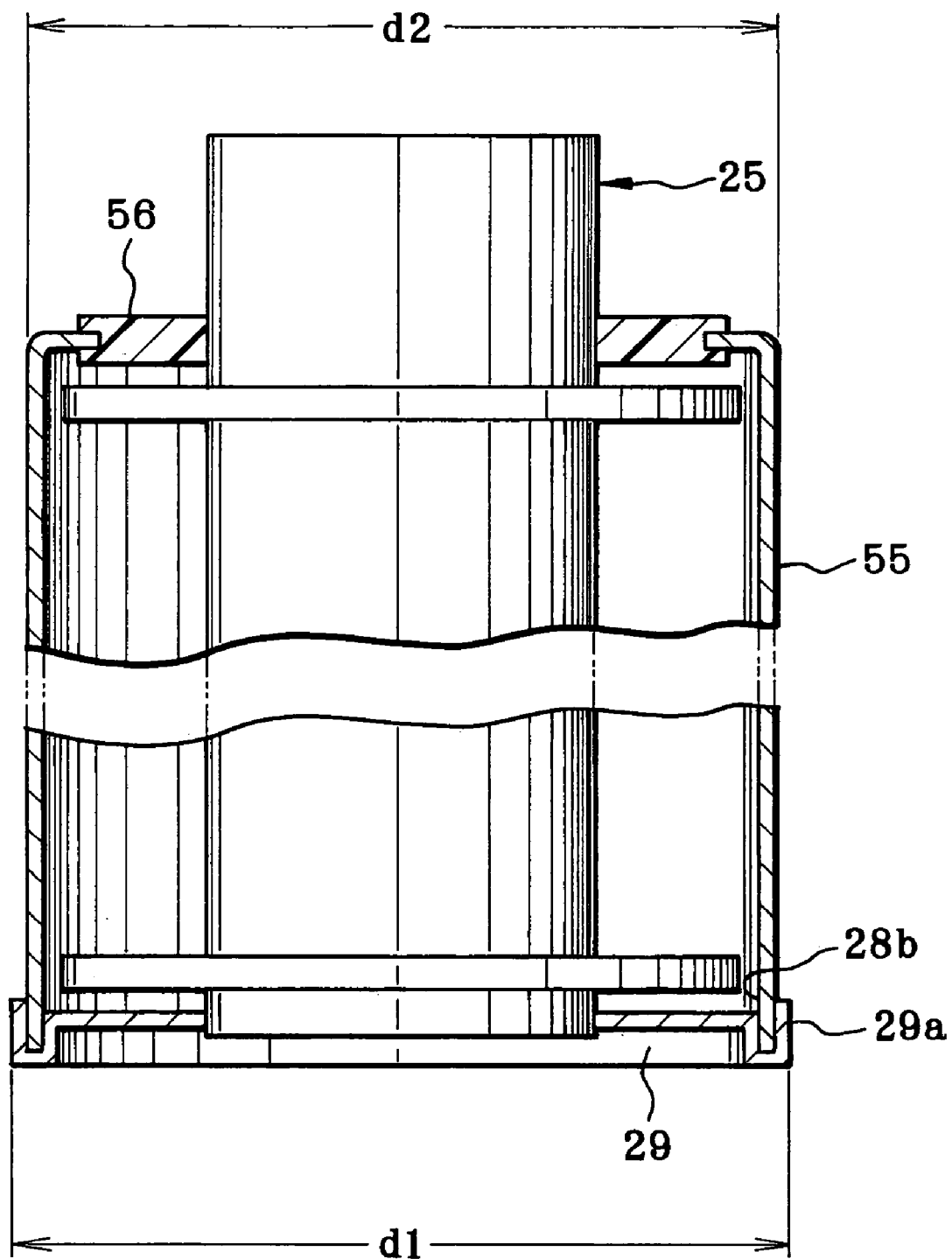
FIG. 8 is a vertical section illustrating still another preferred photo film cassette of which an upper end panel is formed by the insert molding.

Furthermore, FIG. 8 illustrates one preferred photo film cassette, in which an upper end panel 56 as a second end panel is formed from resin, and provided inside a body tube 55 according to the insert molding.

Let Amax be a maximum of an end panel outer diameter of 135 type according to the standards. In the cassette, D2<Amax in satisfying the condition of d2≦D2<d1≦D1.

This being so, it is possible to prevent reloading of a standardized type of photo film cassette having the outer diameter d2 across the upper end cap 27 or panel 45 as a value greater than the inner diameter D2 of the upper chamber end region 24b, because the inner diameter D2 is predetermined smaller than the maximum diameter Amax. It is to be noted that an effect in preventing reloading of commercially available cassettes can be higher according to smallness of the inner diameter D2. However, the outer diameter d2 of the photo film cassette 21 to be inserted in manufacturing the lens-fitted photo film unit must be small according to the inner diameter D2. Should the outer diameter d2 of the photo film cassette 21 be considerably smaller than a tolerable range according to the standards, it is likely that the photo film cassette 21 cannot be set directly in a photo film processor.

Accordingly, it is preferable that the inner diameter D2 of the upper chamber end region 24b is in a range between the mean value of the tolerable outer diameter and the minimum value of the tolerable outer diameter according to the end panel of the standards. Furthermore, it is preferable that the outer diameter d2 across the upper end cap 27 or panel 45 of the photo film cassette 21 is in a range between the inner diameter D2 and the minimum value of the tolerable outer diameter according to the end panel of the standards. According to the standardized 135 type, the end panels of the cassette have a maximum tolerable outer diameter of 25.30 mm, a minimum tolerable outer diameter of 24.90 mm, and a mean outer diameter of 25.10 mm. Thus, it is preferable that the inner diameter D2 of the upper chamber end region 24b satisfies the condition of 24.90 mm≦D2≦25.10 mm.

Furthermore, the outer diameter d2 of the upper end panel or portion of the cassette can be smaller than determined according to the standards in a range allowed in the practical use. In association with this, the inner diameter D2 of the upper chamber end region 24b can be smaller. This is effective in reloading the widely used type of photo film cassette.

Experimental measurement was conducted for photo film cassettes sold in the market. Outer diameters of an upper end panel, a lower end panel and a body tube were measured with the photo film cassettes. According to this, ranges of the outer diameters, an average diameter Ba of the body tube outer diameter, and a standard deviation σ of the body tube outer diameter were obtained. Note that five samples of cassettes were measured. Four positions were used to measure the end panel outer diameters and the body tube for each one of the five samples. Results of the measurements were as below.

End panel outer diameter: 25.08–25.22 mm
Body tube outer diameter: 24.00–24.27 mm
Average diameter Ba=24.168 mm
Standard deviation σ=0.079 mm Let the body tube outer diameter of the commercially available cassette take values statistically according to the normal distribution, so that $Ba-5\sigma \leq d2 \leq Ba+5\sigma$.

It is considered that the outer diameter d2 of the upper end cap or panel 27 or 45 of the cassette is approximately equal to the outer diameter d3 of the middle portion in the manner of the cassette of FIG. 6. A range of the upper portion outer diameter d2 is determined according to d3 of the widely available photo film cassette, to obtain Condition 1 of the outer diameter d2 of the upper end cap or panel 27 or 45 as indicated below. According to the standards of the cassette of 135 type, the outer diameter d1 is obtained to satisfy Condition 2.

23.77 mm≤d2≤24.57 mm          Condition 1

24.90 mm≤d1≤25.30 mm          Condition 2

Condition 3 indicated below for the inner diameter D2 of the upper chamber end region 24b is obtained by considering the condition of "d2≦D2<d1≦D1" and Condition 1 indicated above. Condition 4 indicated below for the inner diameter D1 of the lower chamber end region 24a is obtained by considering the condition of "d2≦D2<d1≦D1" and Condition 3 indicated above.

24.60 mm≤D2<24.90 mm          Condition 3

25.30 mm≤D1                    Condition 4

Accordingly, it is possible to prevent the cassette holder chamber 24 from being loaded with nearly all of the commercially available cassettes by conditioning the upper chamber end region 24b according to Conditions 3 and 4. It is to be noted that a lower limit 24.60 mm of the inner diameter D2 of the upper chamber end region 24b is determined suitably by considering Ba+5σ=24.57 mm. Also, an upper limit of the inner diameter D1 of the lower chamber end region 24a can be determined as desired in view of fine differences between products, limits of designing, or the like.

A photo film cassette satisfying Conditions 1 and 2 for the outer diameters d1 and d2 can be contained in the lens-fitted photo film unit with the cassette holder chamber 24 satisfying Conditions 3 and 4. Note that the lower limit of the inner diameter D2 of the upper chamber end region 24b is set 24.60 mm as described above. It follows actually that the outer diameter d2 of the upper end cap or panel 27 or 45 can satisfy a condition of 23.77 mm≤d2≤24.60 mm.

When Condition 1 is satisfied, the outer diameter d2 of the upper end cap or panel 27 or 45 is smaller than determined according to the standardized 135 type. However, this value of the outer diameter d2 is sufficient in view of the practical use. The photo film cassette can be set directly in a photo film processor, from which the photo film can be advanced.

Note that the outer diameters d1 and d2 are in ranges satisfying the condition "d2<d1". Also, Condition 2 is considered to result in "d2≦24.90 mm". However, it is particularly desired for the diameter d2 to satisfy the following Condition 5 in consideration of "d2≦D2<d1≦D1" and Condition 3.

d2≦24.60 mm                   Condition 5

In the above embodiments, the range of the outer diameter d2 of the upper end cap or panel 27 or 45 is determined according to the outer diameter of a tubular portion of the standardized photo film cassette. This is in view of the outer diameter d2 of the upper end cap or panel is approximately equal to the outer diameter d3 of the middle portion of the body tube as indicated in the photo film cassette of FIG. 6.

In the above embodiments, the inner diameter D2 satisfies the combined conditions of d2≦D2<d1≦D1 and 24.90 mm≦D2≦25.10 mm, or satisfies the combined conditions of d2≦D2<d1≦D1 and 24.60 mm≦D2<24.90 mm. Alternatively, the inner diameter D2 of the upper chamber end region 24b preferably can satisfy the combined conditions of d2≦D2 and d1≦D1 and D2<D1 and 24.90 mm≦D2≦25.10 mm. Also, the inner diameter D2 of the upper chamber end region 24b preferably can satisfy the combined conditions of d2≦D2 and d1≦D1 and D2<D1 and 24.60 mm≦D2<24.90 mm. This is effective in preventing reloading of widely used photo film cassettes.

Figure 9:
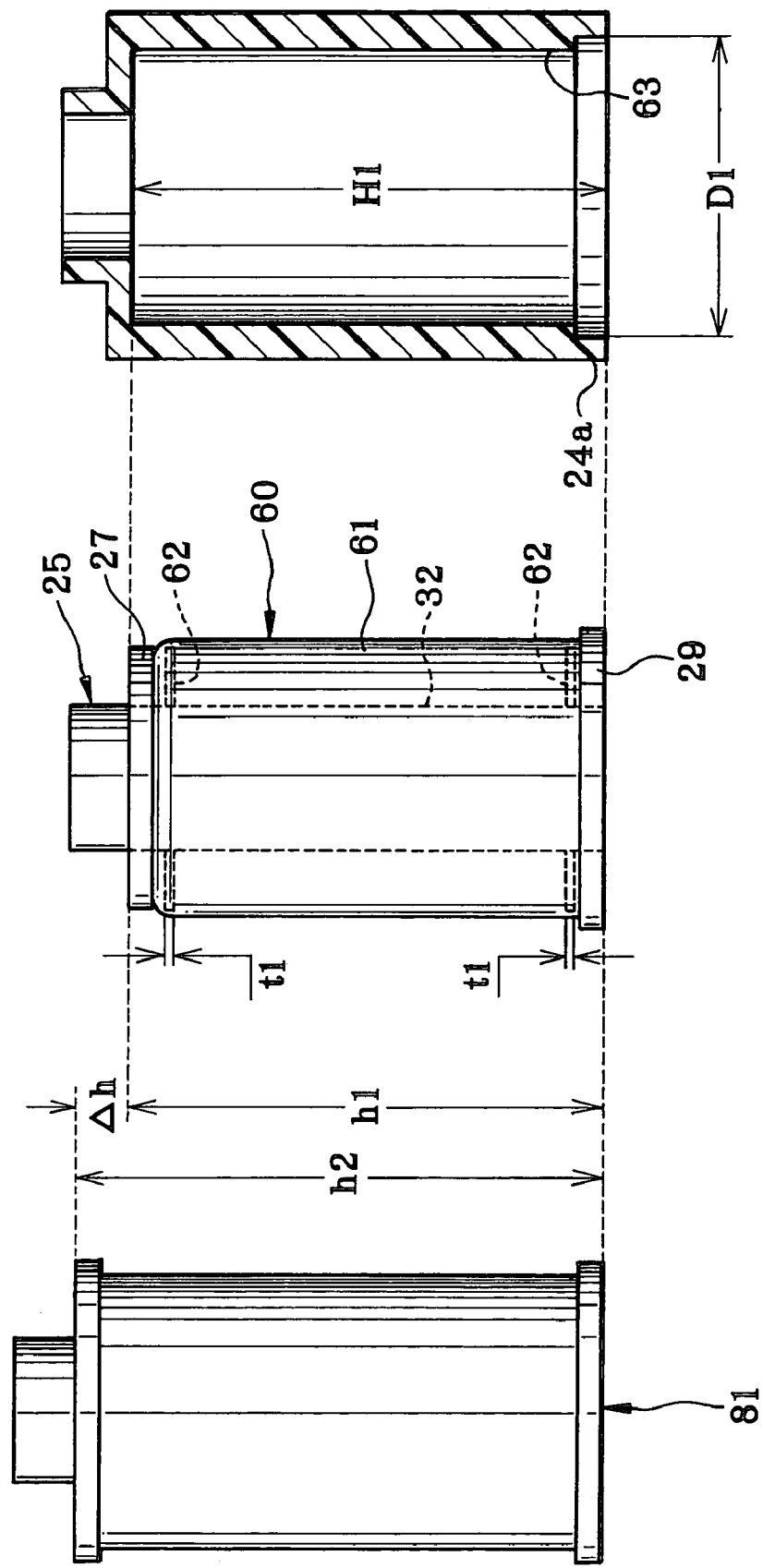
FIG. 9 is an explanatory view in front elevation, illustrating a photo film cassette having spool flanges with a smaller thickness.

In FIG. 9, one preferred photo film cassette is depicted, in which a height of a body tube 61 is smaller than that according to 135 type. Elements similar to those of the above embodiments are designated with identical reference numerals. A photo film cassette 81 of the standardized 135 type is illustrated in FIG. 9, and has a height of the standardized value.

A photo film cassette 60 with a cassette shell is constituted by the body tube 61, which has a height of h1. The height h1 is smaller than the height h2 of that of the photo film cassette 81 by an amount of Δh. Although spool flanges of 135 type are 0.8 mm thick, spool flanges 62 have a thickness of t1≦0.3 mm. Thus, the reduction in the thickness of the spool flanges 62 can reduce the height of the body tube 61 by an amount of 1 mm=Δh in comparison with that of the photo film cassette 81.

In FIG. 9, a cassette holder chamber 63 has a height H1 which is equal to or greater than the height h1 of the body tube 61, and smaller than the height h2 of the body tube of the photo film cassette 81. This condition of the H1 makes it possible to prevent reloading of a photo film cassette with a body tube different from the body tube 61 in relation to the diameter and height. Furthermore, the size of the cassette holder chamber 63 can be reduced, to reduce the size of the lens-fitted photo film unit.

In spite of the above embodiments, it is possible in the present invention that the lower end cap 29 of the cassette shell 26, 42, 60 can have a smaller size than that of the upper end cap 27 or panel 45. For example, the lens-fitted photo film unit can be constructed to set the photo film cassette 21,

41, 60 movable away toward the upper side along an axis of the photo film cassette 21, 41, 60. An outer diameter of the upper end cap 27 or panel 45 of the photo film cassette 21, 41, 60 can be set equal to that of an end panel of 135 type. An outer diameter of the lower end cap 29 of the photo film cassette 21, 41, 60 can be smaller than that of the upper end cap 27 or panel 45. According to those, an inner diameter of the lower chamber end region 24a of the cassette holder chamber 24, 63 can be small. Furthermore, a lens-fitted photo film unit can have a rear face or lateral face through which the photo film cassette 21, 41, 60 is moved and unloaded. For this structure, an outer diameter of the upper end cap 27 or panel 45 of the cassette shell 26, 42, 60 can be smaller than or greater than an outer diameter of the lower end cap 29. Of course, inner diameters of portions of the cassette holder chamber 24, 63 should be predetermined to contain the elements having those values.

Figure 10:
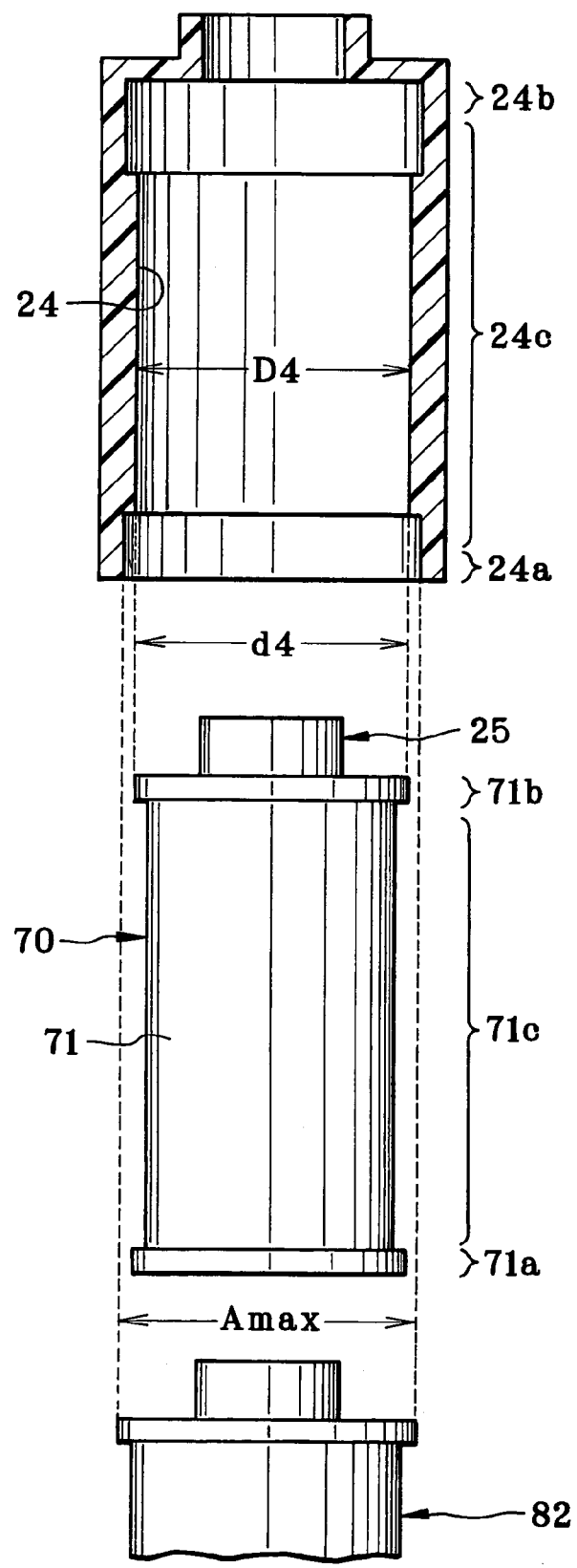
FIG. 10 is a vertical section illustrating another preferred cassette holder chamber with a photo film cassette.

In FIG. 10, another preferred embodiment is illustrated, in which at least one portion of a cassette holder chamber has an inner diameter smaller than the maximum tolerable diameter of the end panel of the photo film cassette of the standardized 135 type. Elements similar to those included in the above embodiments are designated by identical reference numerals. In FIG. 10, a photo film cassette 82 is illustrated, of which an end panel outer diameter is Amax in a tolerable range of the standardized 135 type.

A photo film cassette 70 is inserted into the cassette holder chamber 24 at the time of manufacturing. The chamber middle region 24c is included in the cassette holder chamber 24, and has an inner diameter D4 which is smaller than the maximum tolerable diameter Amax of an end panel of 135 type as standardized. The inner diameter of the remaining portions of the cassette holder chamber 24 is the maximum tolerable diameter Amax. However, the remaining portions can have an inner diameter greater or smaller than the maximum tolerable diameter Amax in a range allowing loading of the photo film cassette 70.

In the photo film cassette 70, portions of a cassette shell 71 include a lower end cap 71a, an upper end cap 71b and a body tube 71c. Any of the end caps 71a and 71b and the body tube 71c has an outer diameter equal to or smaller than the inner diameter D4. Note that the lower end cap 71a can have a diameter equal to that of the upper end cap 71b.

The inner diameter D4 of the cassette holder chamber 24 is thus set smaller than the maximum diameter Amax. It is possible to prevent reloading of a cassette having a greater diameter than the inner diameter D4 in a range according to the standards. If the inner diameter D4 of the cassette holder chamber 24 is predetermined even smaller, it is possible according to the smallness to prevent reloading of cassettes of a greater number of kinds. Effects of preventing reloading can be higher. However, diameters of the end caps 71a and 71b of the photo film cassette 70 must be small according to the inner diameter D4 for being inserted at the time of producing lens-fitted photo film units. In setting the outer diameter of the photo film cassette 70 still smaller than the standardized range of the panel outer diameter, it is remarkably likely that the photo film cassette 70 cannot be loaded in a photo film processor.

Consequently, it is preferable to determine the inner diameter D4 of the chamber middle region 24c as 24.10–24.90 mm, namely between upper and lower limit values, the upper limit value being a mean value of the standardized range of an end panel outer diameter of a cassette, the lower limit value being the minimum value of the same standardized range of an end panel outer diameter.

Also, it is preferable to determine the end panel outer diameter of the photo film cassette 70 between upper and lower limit values, the upper limit value being the inner diameter D4, the lower limit value being the minimum value of the standardized range of the end panel outer diameter itself. Furthermore, it is preferable to determine an outer diameter of the body tube 71c within a tolerable range of that of 135 type of cassette, and equal to or smaller than an outer diameter of the end caps 71a and 71b of the cassette shell 71. Also, it is preferable to determine the outer diameter of the body tube 71c in a range of 24.60–24.90 mm which is outside the standardized range but can be determined safely for the practical use.

In the above embodiments, the chamber middle region 24c is provided with the portion having the inner diameter D4 that is smaller than the maximum diameter Amax. However, one or more portions having the inner diameter D4 that is smaller than the maximum diameter Amax can be suitably provided in a different manner, for example, for the purpose of facilitating manufacture, and modifying forms of loading or unloading a photo film cassette. A preferable cassette holder chamber 24 has one common inner diameter D4 smaller than the maximum tolerable diameter Amax. Alternatively, either of lower and upper halves of the cassette holder chamber 24 may be provided with an inner diameter D4 smaller than the maximum tolerable diameter Amax. Only a lower chamber end region 24a as a first chamber end region, and/or an upper chamber end region 24b as a second chamber end region may be provided with an inner diameter D4 smaller than the maximum tolerable diameter Amax. Also, plural portions of the cassette holder chamber 24 may be provided with an inner diameter D4 smaller than the maximum tolerable diameter Amax.

In any of the above embodiments, the various dimensions are determined according to the ISO standards for the 135 type. However, dimensions of the 135 type of photo film cassette can be determined according to ANSI, JIS or any of various suitable industrial standards.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, having a photo film holder chamber and a cassette holder chamber, said photo film holder chamber being loaded with a roll of unexposed photo film, and said cassette holder chamber being loaded with a cassette for winding and containing said photo film after being exposed, said lens-fitted photo film unit comprising:

said cassette comprising a cassette shell and a spool rotatably mounted therein, the cassette shell including first and second end portions, and a middle portion disposed between said first and second end portions, said first end portion having an outer diameter d1, said second end portion having an outer diameter d2, wherein said outer diameter d1 is in a standardized range according to 135 type of a photo film cassette;

said cassette holder chamber including first and second chamber end regions, and a chamber middle region, said first and second chamber end regions receiving respectively said first and second end portions, said chamber middle region receiving said middle portion, said first chamber end region having an inner diameter D1, said second chamber end region having an inner diameter D2;

wherein said cassette and said cassette holder chamber satisfy a condition of:

d2≦D2<d1≦D1.

2. A lens-fitted photo film unit having a photo film holder chamber and a cassette holder chamber, said photo film holder chamber being loaded with a roll of unexposed photo film, and said cassette holder chamber being loaded with a cassette for winding and containing said photo film after being exposed, said lens-fitted photo film unit comprising:

said cassette including first and second end portions, and a middle portion disposed between said first and second end portions, said first end portion having an outer diameter d1, said second end portion having an outer diameter d2, wherein said outer diameter d1 is in a standardized range according to 135 type of a photo film cassette;

said cassette holder chamber including first and second chamber end regions, and a chamber middle region, said first and second chamber end regions receiving respectively said first and second end portions, said chamber middle region receiving said middle portion, said first chamber end region having an inner diameter D1, said second chamber end region having an inner diameter D2;

wherein said cassette and said cassette holder chamber satisfy a condition of:

d2≦D2<d1≦D1;

wherein said middle portion has an outer diameter d3, said chamber middle region has an inner diameter D3;

wherein said cassette and said cassette holder chamber satisfy conditions of:

d2≦d3<d1,

D2≦D3<D1, d2≦D2 and d3≦D3 and d1≦D1.

3. A lens-fitted photo film unit having a photo film holder chamber and a cassette holder chamber, said photo film holder chamber being loaded with a roll of unexposed photo film, and said cassette holder chamber being loaded with a cassette for winding and containing said photo film after being exposed, said lens-fitted photo film unit comprising:

said cassette including first and second end portions, and a middle portion disposed between said first and second end portions, said first end portion having an outer diameter d1, said second end portion having an outer diameter d2, wherein said outer diameter d1 is in a standardized range according to 135 type of a photo film cassette;

said cassette holder chamber including first and second chamber end regions, and a chamber middle region, said first and second chamber end regions receiving respectively said first and second end portions, said chamber middle region receiving said middle portion, said first chamber end region having an inner diameter D1, said second chamber end region having an inner diameter D2;

wherein said cassette and said cassette holder chamber satisfy a condition of:

d2≦D2<d1≦D1;

wherein said second chamber end region is positioned internally from said first chamber end region with respect to said cassette holder chamber.

4. A lens-fitted photo film unit as defined in claim 3, further comprising a lid portion for closing said first chamber end region, said lid portion being opened after said photo film being exposed is contained in said cassette, then said cassette being removed from said cassette holder chamber through said first chamber end region.

5. A lens-fitted photo film unit as defined in claim 4, wherein said outer diameter d3 is in a standardized range according to said 135 type of said photo film cassette.

6. A lens-fitted photo film unit as defined in claim 4, wherein 24.90 mm≦D2≦25.10 mm.

7. A lens-fitted photo film unit as defined in claim 4, wherein 24.60 mm≦D2≦25.90 mm.

8. A lens-fitted photo film unit as defined in claim 4, wherein said cassette includes:

a cassette shell, constituted by said middle portion and said first and second end portions, and having a passageway for passage of said photo film;

a spool, having one spool end protruded through said second end portion, contained in said cassette shell in a rotatable manner, for winding said photo film;

a pair of two spool flanges, formed with said spool, for regulating a position of said photo film in a width direction thereof.

9. A lens-fitted photo film unit as defined in claim 8, wherein each of said spool flanges has a thickness equal to or less than 0.3 mm, and a length of said cassette shell is smaller than a cassette shell length of said 135 type.

10. A lens-fitted photo film unit as defined in claim 8, wherein said cassette shell includes:

a body tube in a shell form, having first and second shell ends, wherein said second shell end has a stepped shape, and has a smaller diameter than said first shell end;

a first end cap, secured to said body tube, fitted on surfaces of said first shell end, said first end cap including a peripheral portion, disposed about said first shell end, and having said outer diameter d1;

a second end cap, secured to said body tube, fitted on surfaces of said second shell end, said second end cap including a peripheral portion, disposed about said second shell end, and having said outer diameter d2;

first and second axial holes, formed respectively in said first and second end caps, for receiving insertion of said spool in a rotatable manner.

11. A lens-fitted photo film unit as defined in claim 10, wherein each of said body tube and said first and second end caps is formed from a plate of metal.

12. A lens-fitted photo film unit as defined in claim 8, wherein said cassette shell includes:

a shell-shaped body tube in a cup form, having first and second shell ends, and including an opening formed in said first shell end, and an end panel constituting said second shell end, said second shell end having said outer diameter d2;

an end cap, secured to said body tube, fitted on surfaces of said first shell end, said end cap including a peripheral portion, disposed about said first shell end, and having said outer diameter d1;

a first axial hole formed in said end panel; and a second axial hole, formed in said end cap, for keeping said spool rotatable in cooperation with said first axial hole.

13. A lens-fitted photo film unit as defined in claim 12, wherein said body tube is produced by drawing of a plate of metal.

14. A lens-fitted photo film unit as defined in claim 12, wherein said body tube is formed from plastic material, one portion of said end panel is ring-shaped, and formed on said body tube by insert molding.

15. A lens-fitted photo film unit comprising:
   a photo film holder chamber for containing a roll of unexposed photo film;
   a cassette holder chamber for containing a cassette adapted to winding and containing an exposed portion of said photo film therein;
   wherein one end of said cassette holder chamber has an inner diameter in a range of 24.90–25.10 mm, and an opposite end of the cassette holder chamber has an inner diameter of at least 25.3 mm.

16. The lens-fitted photo film unit of claim 15, wherein the at least one portion of the cassette holder chamber having an inner diameter in the range of 24.90–25.10 corresponds to a distal end of a cassette shell that encloses the photo film.

17. A lens-fitted photo film unit comprising:
   a photo film holder chamber for containing a roll of unexposed photo film;
   a cassette holder chamber for containing a cassette adapted to winding and containing an exposed portion of said photo film therein;
   wherein one end of said cassette holder chamber has an inner diameter in a range of 24.60– 24.90 mm, and an opposite end of the cassette holder chamber has an inner diameter of at least 25.3 mm.

18. The lens-fitted photo film unit of claim 17, wherein the at least one portion of the cassette holder chamber having an inner diameter in the range of 24.60–24.90 corresponds to a distal end of a cassette shell that encloses the photo film.

19. A cassette for containing photo film, comprising:
   a cassette shell, constituted by first and second end portions, and a middle portion disposed between said first and second end portions, and having a passageway for passage of said photo film;
   a spool, having one spool end protruded through said first end portion, contained in said cassette shell in a rotatable manner, for winding said photo film;
   a pair of two spool flanges, formed with said spool, for regulating a position of said photo film in a width direction thereof;
   said first end portion having a first outer diameter in a range of 24.60–24.90 mm, said second end portion having a second outer diameter in a standardized range according to 135 type of a photo film cassette.

20. A cassette as defined in claim 19, wherein said middle portion has an outer diameter equal to or smaller than said second outer diameter.

21. A cassette as defined in claim 19, wherein said middle portion has an outer diameter in a standardized range according to said 135 type of said photo film cassette.

22. A cassette for containing photo film, comprising:
   a shell-shaped body tube having first and second shell ends, and a middle portion disposed between said first and second shell ends, wherein said second shell end has a stepped shape, and has a smaller diameter than said first shell end;
   a first end cap, secured to said body tube, fitted on surfaces of said first shell end;
   a second end cap, secured to said body tube, fitted on surfaces of said second shell end, said second end cap including a peripheral portion, disposed about said second shell end, and having an outer diameter smaller than an outer diameter of said middle portion;
   first and second axial holes formed respectively in said first and second end caps; and
   a spool, inserted in said first and second axial holes in a rotatable manner, for winding said photo film, said spool having one spool end protruding through said second shell end.

23. A cassette for containing photo film, comprising:
   a cassette shell in a cup form, having first and second shell ends, and including an opening formed in said first shell end, and an end panel constituting said second shell end;
   an end cap, secured to said cassette shell, fitted on surfaces of said first shell end;
   a first axial hole formed in said end panel;
   a second axial hole, formed in said end cap;
   a spool, inserted in said first and second axial holes in a rotatable manner, for winding said photo film, said spool having one spool end protruding through a selected one of said first and second axial holes.

24. A cassette as defined in claim 23, wherein said cassette shell is produced by drawing of a plate of metal.

25. A cassette as defined in claim 23, wherein said cassette shell is formed from plastic material, one portion of said end panel is ring-shaped, and formed on said cassette shell by insert molding.

* * * * *